(12) United States Patent
Troxell et al.

(10) Patent No.: US 7,981,189 B2
(45) Date of Patent: Jul. 19, 2011

(54) CAPTIVE TOOLESS FASTENER FOR SECURING AN ENGINE INTAKE AIR FILTER AND CLAMP ASSEMBLY FOR AIR FILTER HOUSING

(75) Inventors: Ronald Troxell, Clarendon Hills, IL (US); Roy E. Greenlees, Lake Forest, IL (US); Kenneth S. Schultz, Evanston, IL (US)

(73) Assignee: Greenlees Filter LLC, Forest Park, IL (US)

( * ) Notice: Subject to any disclaimer, the term of this patent is extended or adjusted under 35 U.S.C. 154(b) by 477 days.

(21) Appl. No.: 11/214,691

(22) Filed: Aug. 29, 2005

(65) Prior Publication Data

US 2007/0044441 A1    Mar. 1, 2007

(51) Int. Cl.
*B01D 46/00* (2006.01)
(52) U.S. Cl. .... 55/529; 55/498; 55/DIG. 28; 123/41.65; 123/198 E; 292/1.5; 292/253; 292/336.6; 292/359; 411/81; 411/352; 411/353; 411/427; 411/435; 411/970
(58) Field of Classification Search .............. 55/498, 55/DIG. 28, 492, 496, 495, 529; 123/198 E, 123/41.65; 292/1.5, 253, 336.3, 359; 411/435, 411/81, 427, 999, 352, 353, 970
See application file for complete search history.

(56) References Cited

U.S. PATENT DOCUMENTS

| | | | | |
|---|---|---|---|---|
| 721,608 A * | 2/1903 | Ruggles et al. | ............ | 15/104.18 |
| 1,397,373 A * | 11/1921 | Gemmer | ............ | 403/59 |
| 1,598,097 A * | 8/1926 | Mathis | ............ | 55/492 |
| 2,470,344 A * | 5/1949 | Dzus | ............ | 411/548 |
| 2,846,244 A * | 8/1958 | Parker | ............ | 285/409 |
| 2,905,266 A * | 9/1959 | Poch | ............ | 55/418 |
| 3,680,706 A * | 8/1972 | Baer et al. | ............ | 210/238 |
| 4,020,783 A * | 5/1977 | Anderson et al. | ............ | 116/268 |
| 4,114,506 A * | 9/1978 | Aimar | ............ | 411/512 |
| 4,171,963 A * | 10/1979 | Schuler | ............ | 55/302 |
| 4,482,368 A * | 11/1984 | Roberts | ............ | 55/480 |
| 4,767,427 A * | 8/1988 | Barabas et al. | ............ | 55/493 |
| 5,064,458 A * | 11/1991 | Machado | ............ | 55/482 |
| 5,120,337 A * | 6/1992 | Benzler et al. | ............ | 55/482 |
| 5,328,606 A * | 7/1994 | Warren et al. | ............ | 210/238 |
| 6,022,391 A * | 2/2000 | Greenlees et al. | ............ | 55/385.1 |
| 6,099,729 A * | 8/2000 | Cella et al. | ............ | 210/315 |
| 6,368,388 B1 * | 4/2002 | Kosmider et al. | ............ | 95/273 |
| 7,344,345 B2 * | 3/2008 | Aukzemas | ............ | 411/372 |

* cited by examiner

Primary Examiner — Michael A Marcheschi
Assistant Examiner — Anthony Shumate
(74) Attorney, Agent, or Firm — Orum & Roth LLC

(57) ABSTRACT

The invention has a captive tooless fastener for securing the engine intake air filter. The tooless fastener comprises shaft and associated bodies. The body has two arms oriented about 180 degrees apart. The shaft is threaded through a sealing washer and an aperture in a closed end cap of the air filter. The shaft is expanded so it cannot be removed from the end cap. The body's threaded inner diameter mates with a threaded portion of a central shaft in an air filter housing. The body's arms are rotated to screw the fastener and the shaft of the housing together. When tightened, the sealing washer closes the aperture. To remove the air filter, the fastener is unscrewed from the shaft of the housing and in the shaft floats in the aperture. A person in the field can remove the air filter by inserting fingers under the arms and pulling.

1 Claim, 13 Drawing Sheets

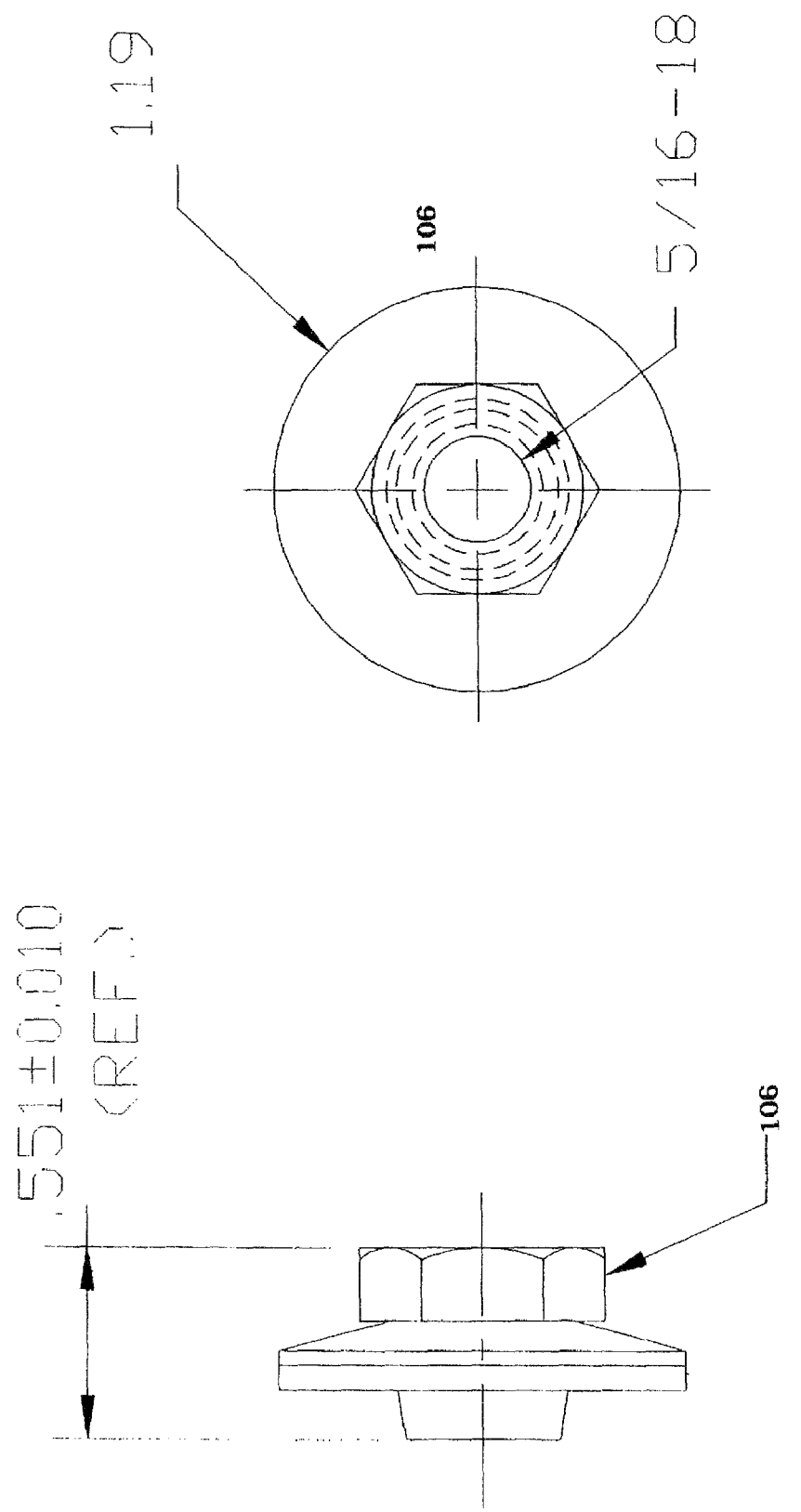

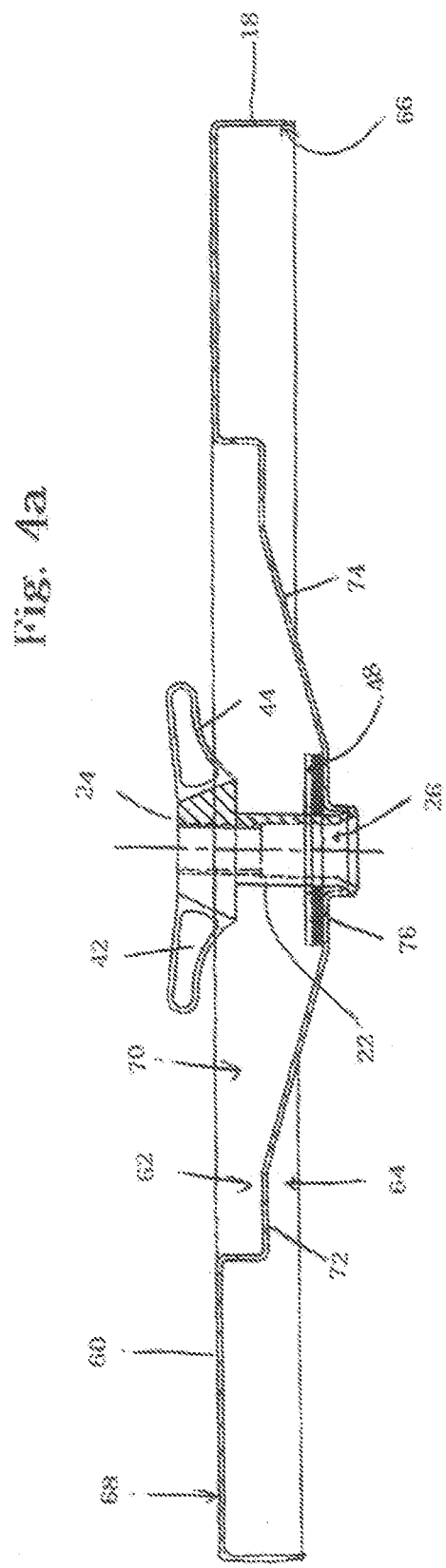

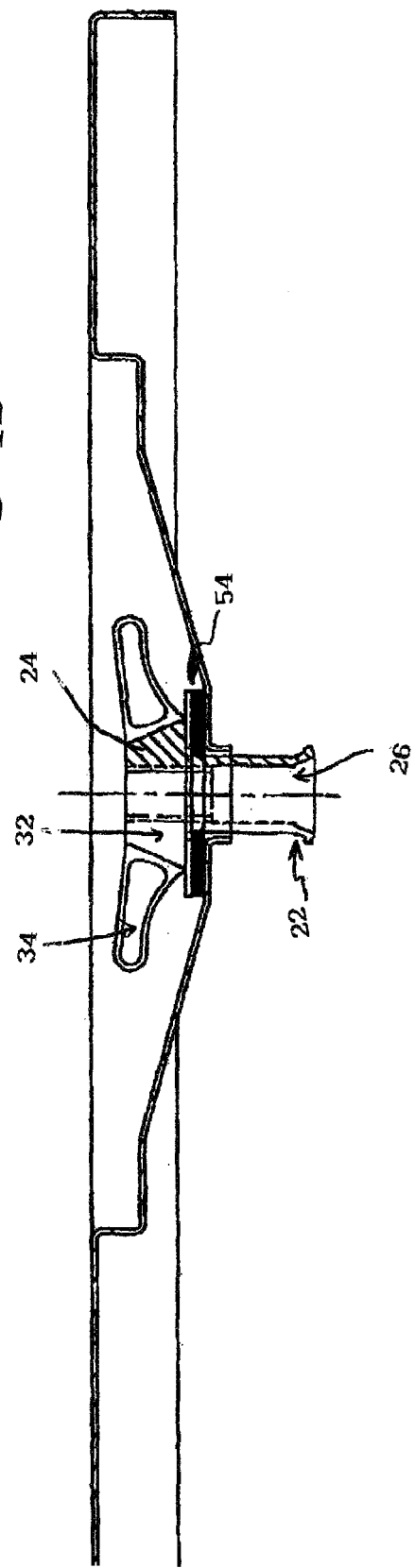

CAPTIVE TOOLESS FASTENER FOR SECURING AN ENGINE INTAKE AIR FILTER AND CLAMP ASSEMBLY FOR AIR FILTER HOUSING

BACKGROUND OF THE INVENTION

1. Field of the Invention

The present invention relates to engine intake air filters. More specifically, it relates to a captured tooless fastener for securing the engine intake air filter in the air filter housing and a clamp assembly for closing the air filter housing.

2. Description of Related Art

Many types of vehicles use engine intake air filters. In severe or extreme conditions, it is necessary to routinely replace and/or clean the air filter which is accommodated in an air filter housing.

For example, the United States military M998, 1¼ ton truck, also known as the HMMWV or Hummer, uses an engine intake air filter secured in place by 5/16th inch hex head nut 106. Once, housing cover 112 is removed hex head nut 106 securing the air filter must be removed. To complete the removal and/or installation of air filter 100, a wrench of the correct size must be used to loosen and tighten hex head nut 106. In the field, there is a risk that the wrench will be lost, misplaced, or damaged. If the correct wrench is not available, necessary maintenance cannot be performed and in severe conditions, this can make the vehicle interoperable.

Once removed nut 106 and coordinating sealing washer are removed, they become loose parts. If either part is lost or misplaced air filter 100 cannot be properly reinstalled. If there is no replacement nut 106 and washer, air filter 100 cannot be installed the vehicle is inoperable.

As shown in FIGS. 1 and 3a, once the hex head nut 106 has been removed a ring 102 on the closed end cap 104 of air filter 100 is pulled to remove air filter 100 from housing 110. Ring 102 is a separate piece secured to closed end cap 104. Because ring 102 is a separate piece from closed end cap 104, there is the risk that ring 102 could separate from closed end cap 104 due to careless manufacturing, failed spot welds, excessive force and/or extreme conditions. If ring 102 and closed end cap separate 104, there is no simple way to remove air filter 100.

When an air filter is being installed, there is a risk that the nut will be over torqued using the wrench. This can damage a threaded shaft in the housing that secures the air filter in position. If the threaded shaft is ruined the air filter cannot be replaced and the vehicle is inoperable.

Often people in the field have heavy gloves when replacing the air filter. For example, in some military and industrial situations, the gloves may be hazmat gloves which may not be removed without serious consequences. In other situations, flame retardant or other protective gloves may be needed. The gloves are clumsy and increase the risk that the nut and/or washer will be dropped and lost.

There is a need for an air filter that can be easily installed and removed in the field without tools. There is a need for an air filter than can be replaced without the risk of over torquing the nut. There is a need for an air filter which can be replaced without the risk of losing an essential component. There is also a need for an air filter housing which can be opened and secured without tools and without the risk of losing a component.

SUMMARY OF THE INVENTION

The inventive engine intake air filter includes a captive tooless fastener for securing the engine intake air filter. The tooless fastener comprises a shaft and an associated body. The body has two arms oriented about 180° from one another. The shaft is threaded through a sealing washer and an aperture in an closed end cap of the air filter. The shaft expanded or a component secured to the shaft such that the shaft cannot be removed from the end cap. The body has a threaded inner diameter that mates with a threaded portion of a central shaft in an air filter housing. The arms of the body are rotated to screw the fastener and the shaft of the housing together. When tightened, the aperture is closed by the sealing washer. To remove the air filter, arms are rotated in the reverse direction and the fastener is unscrewed from the shaft of the housing. In this loosened position the shaft floats in the aperture. A person in the field can insert his or her fingers under the arms. The person in the field can pull on the arms and thus use the fastener as a handle for removing the air filter.

Optionally, the air filter is utilized in an air filter housing that is secured using a latch clamp assembly.

BRIEF DESCRIPTION OF THE FIGURES

FIGS. 3b and 3c are a prior art hex nut for connecting the prior art closed end air filter to an air filter housing.

FIG. 4a is a cross section of the closed end cap of the air filter when the fastener is in a loose position.

FIG. 4b is a cross section of the closed end cap of the air filter when the fastener is in a secured position.

FIG. 5b is a first cross section of a first tooless fastener along line B-B of FIG. 5a.

FIG. 5c is a second cross section of the tooless fastener 90° along line C-C of FIG. 5a.

FIG. 5d is an enlarged view of a portion of FIG. 6a.

FIG. 6b is a cross section of the closed end cap of the air filter along line B-B of FIG. 6a.

FIG. 7b is a first cross section of the alternative tooless fastener along line B-B of FIG. 7a.

FIG. 7c is a second cross section of the alternative tooless fastener along line C-C of FIG. 7a.

FIG. 7d is an enlarged view of a portion of FIG. 7a.

FIG. 10b is a cross sectional view of an air filter along line B-B of FIG. 11a.

FIG. 11b is a side view of the latch clamp assembly of FIG. 11a.

DETAILED DESCRIPTION OF THE INVENTION

Figure 1:
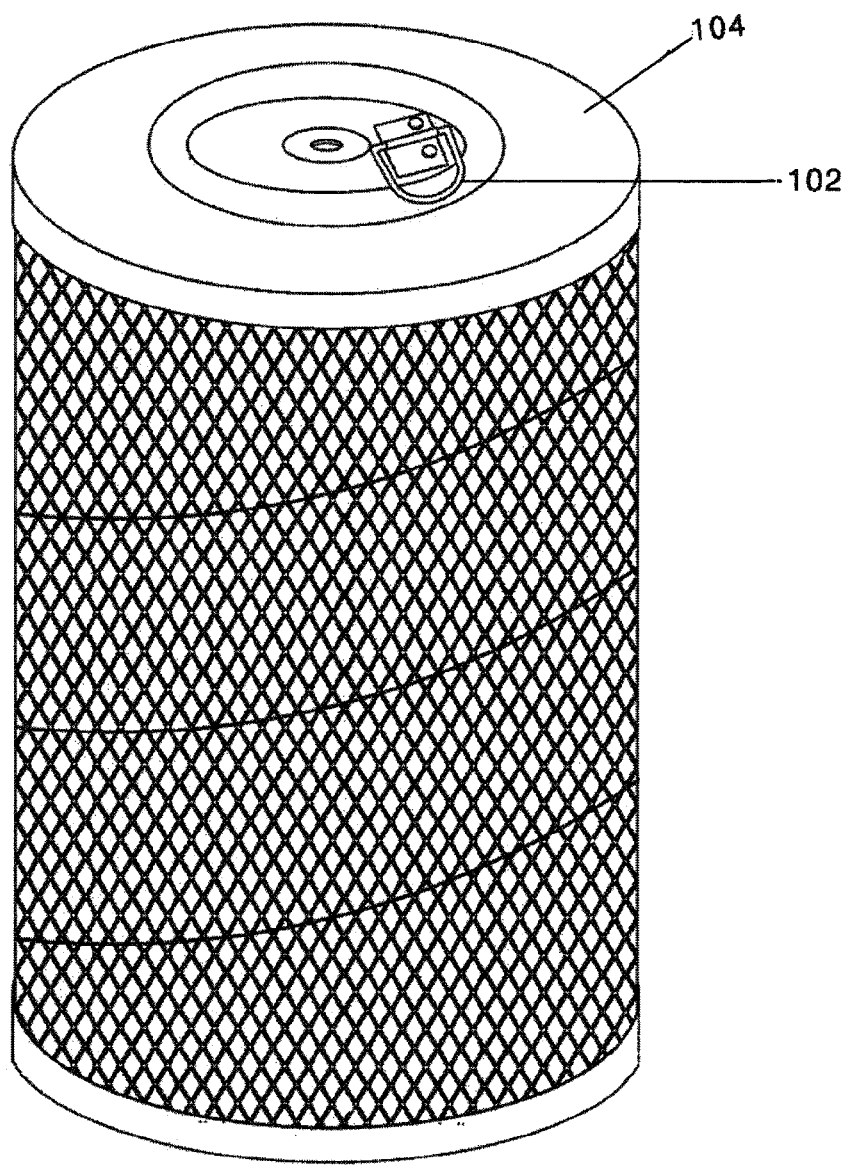
FIG. 1 is a prior art air filter with a closed end cap.
Figure 2B:
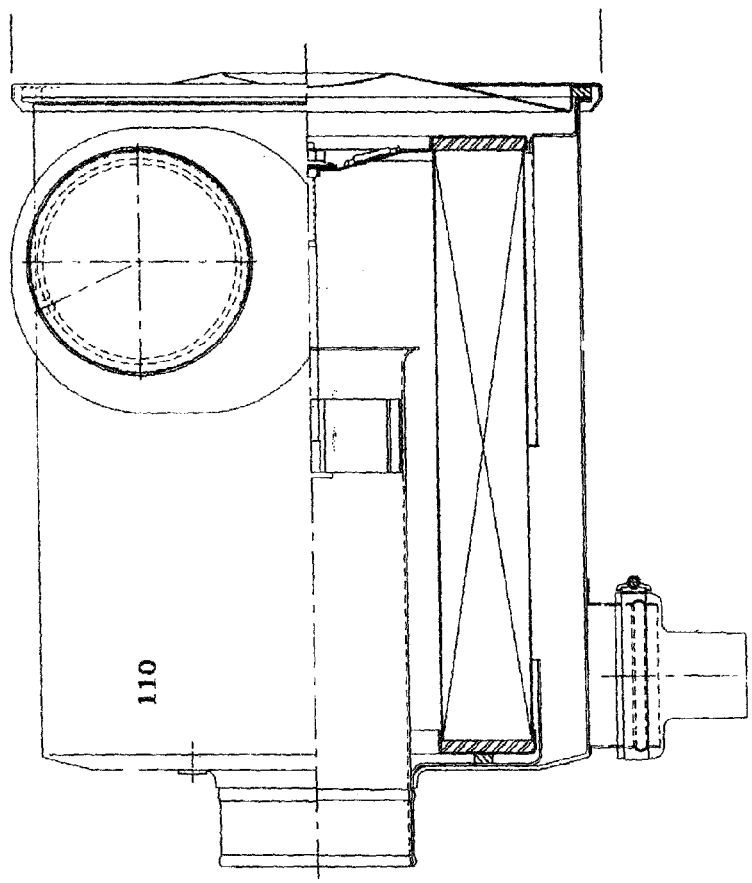
FIGS. 2a-2b is an air filter housing and a cover with a prior art closure.
Figure 2A:
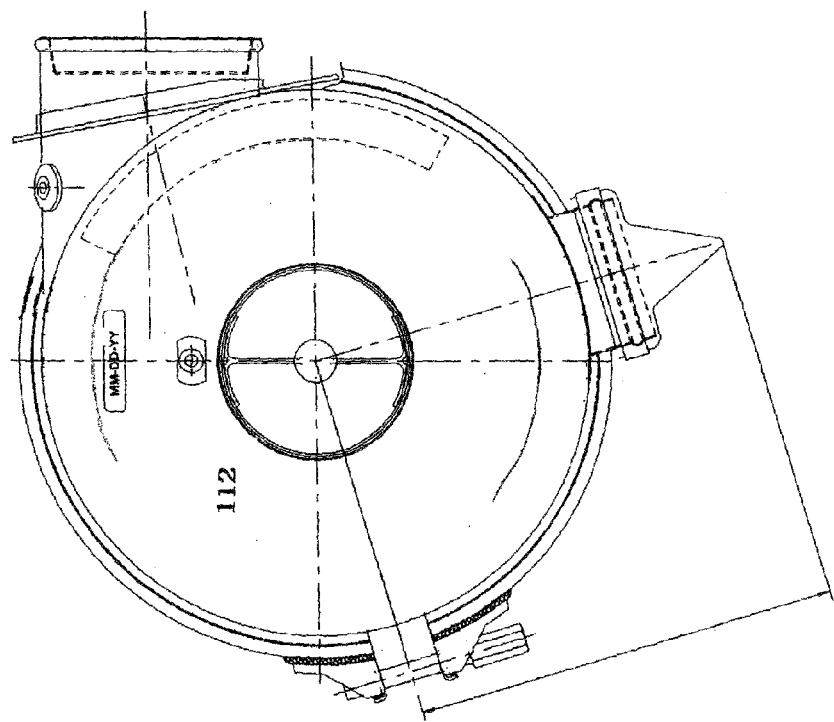
Figure 3A:
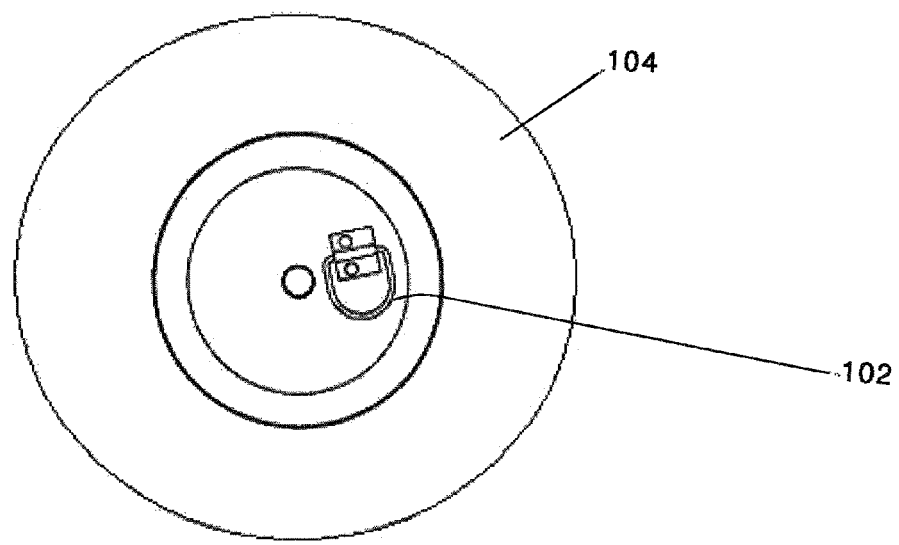
FIG. 3a is a prior art closed end cap of an air filter.
Figure 5A:
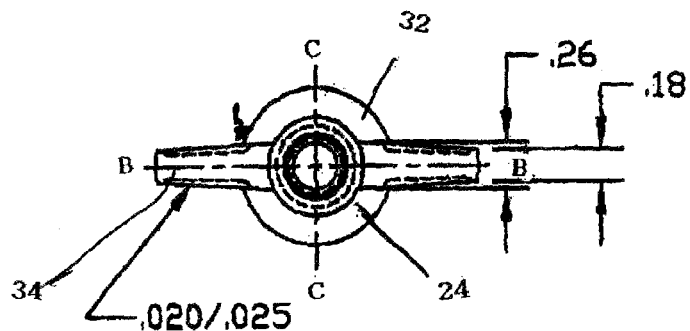
FIG. 5a is a top view of the tooless fastener
Figure 5B:
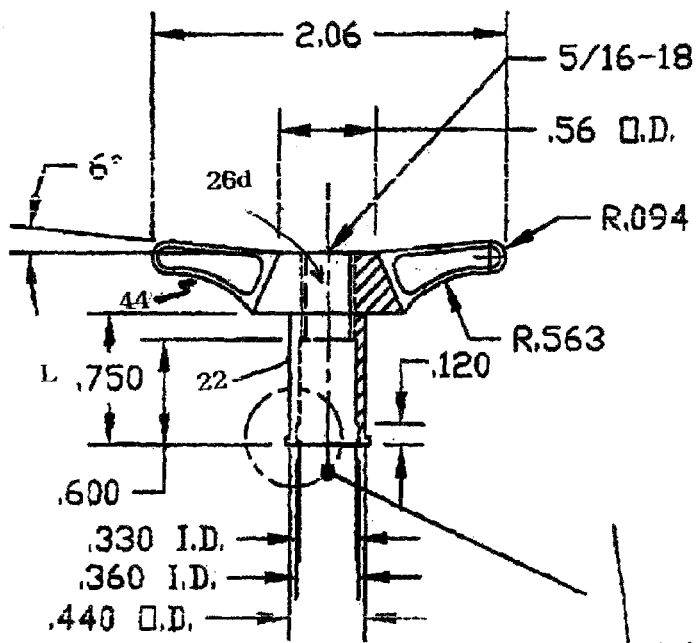
Figure 5D:
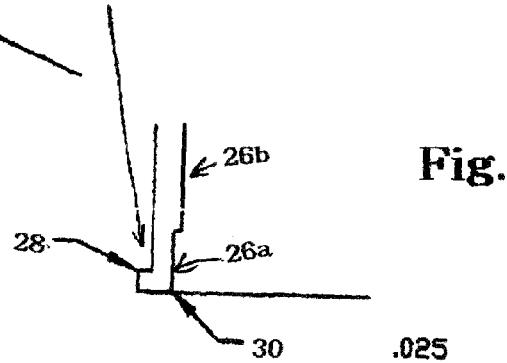
Figure 5C:
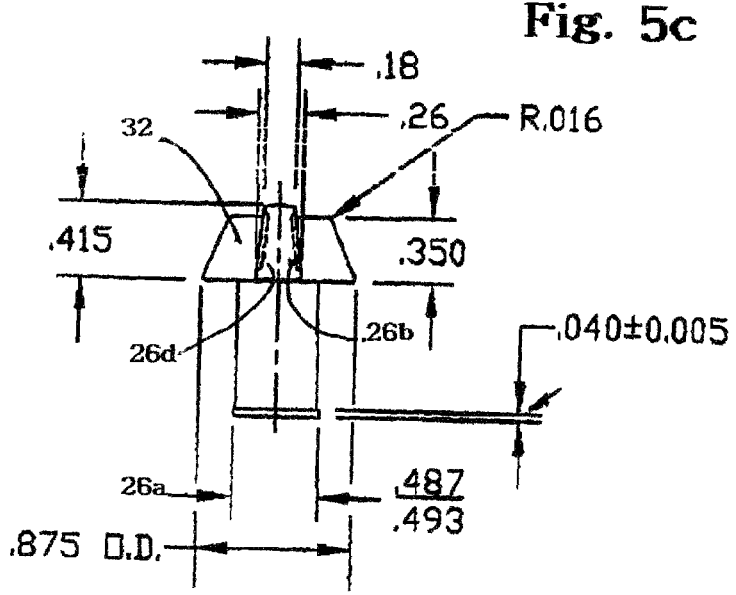
Figure 6A:
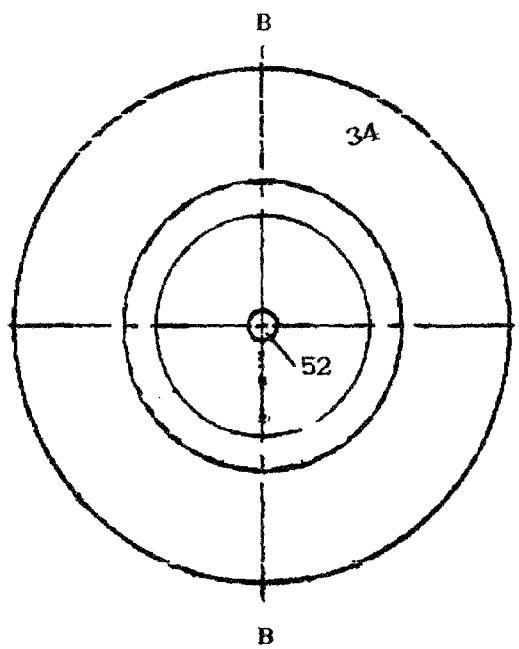
FIG. 6a is a top view of the closed end cap of the air filter with a tooless fastener.
Figure 6B:
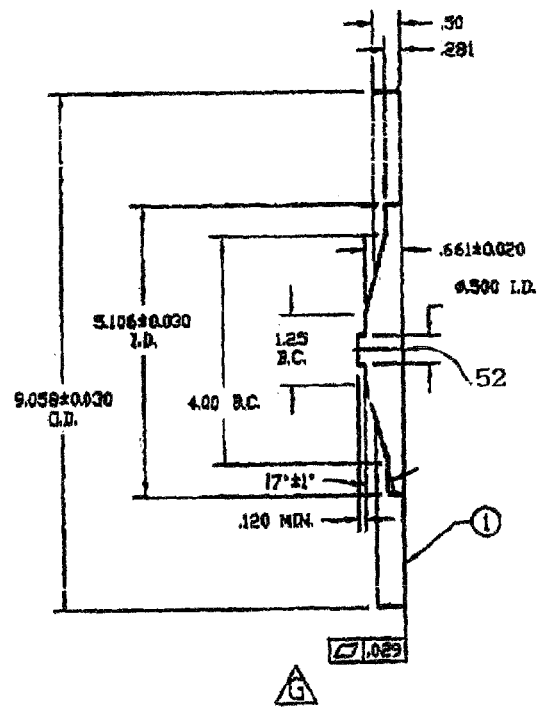
Figure 7A:
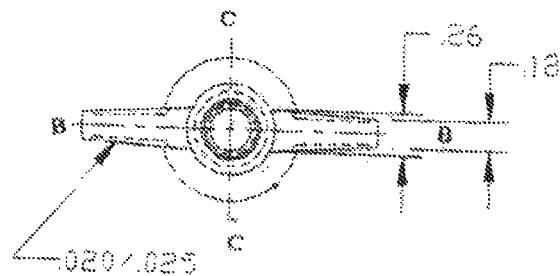
FIG. 7a is a top view of the alternative tooless fastener
Figure 7B:
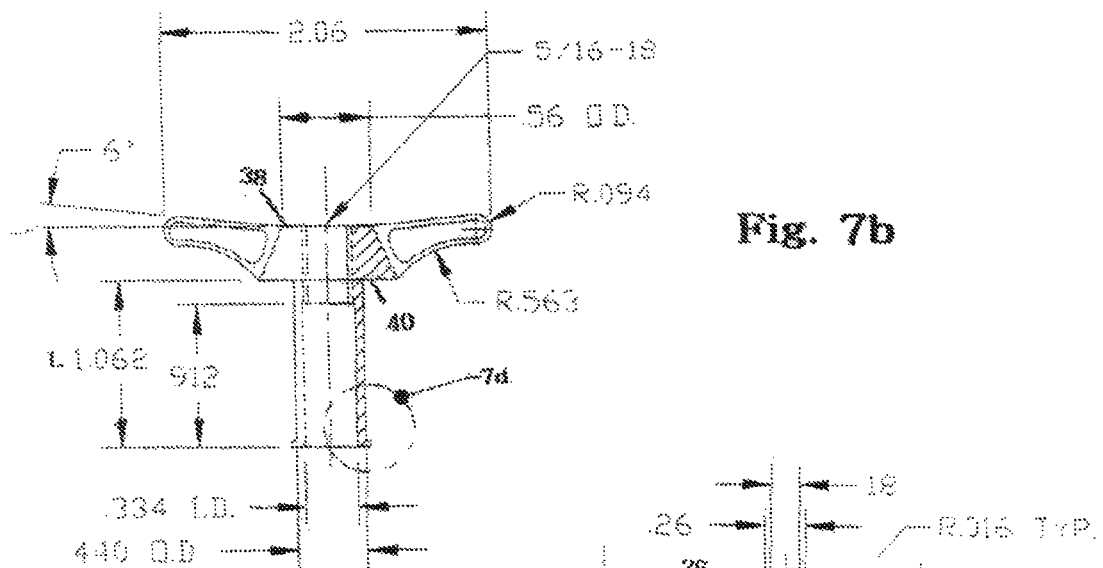
Figure 7C:
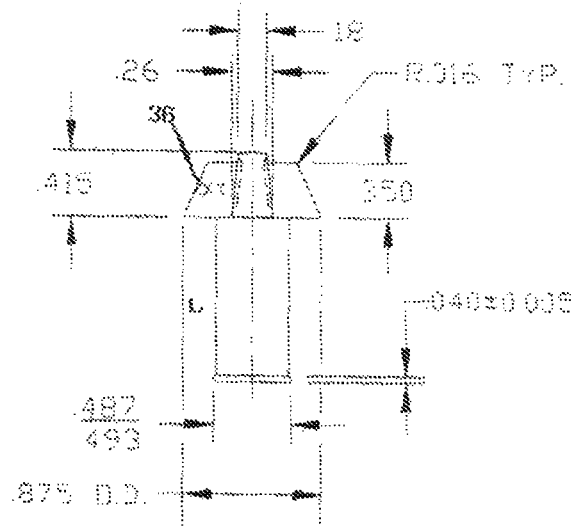
Figure 7D:
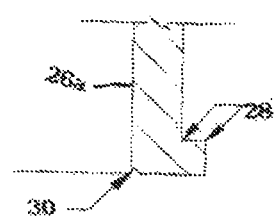
Figure 8A:
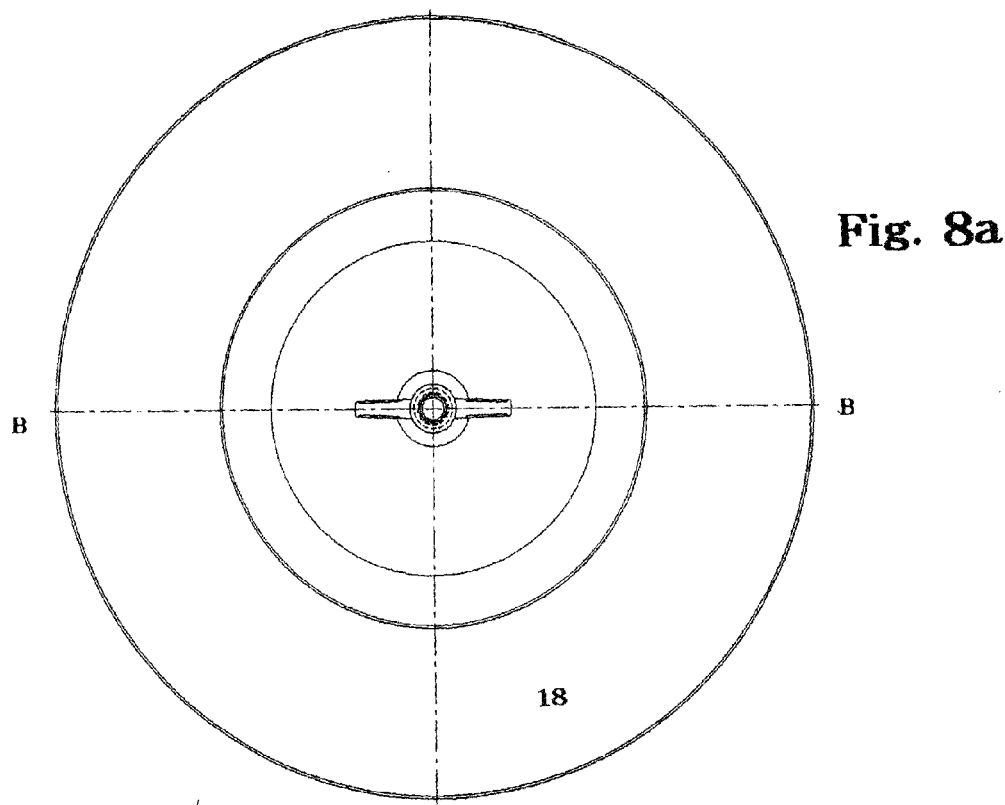
FIG. 8a is a top view of the closed end cap of the air filter with the tooless fastener.
Figure 8B:
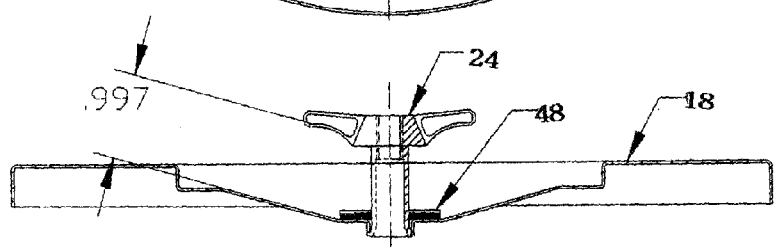
FIG. 8b is a cross section along line B-B of the closed end cap of the air filter of FIG. 8a with the fastener in the loose position.
Figure 8C:
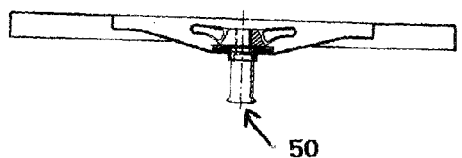
FIG. 8c is a cross section along line B-B of the closed end cap of the air filter of FIG. 8a with the fastener in the secured position.
Figure 9:
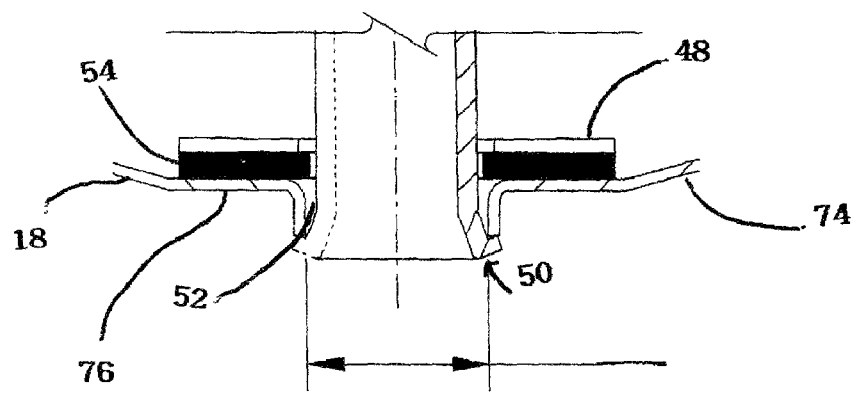
FIG. 9 is a cross section of the shaft of the captive tooless fastener and the closed end cap.
Figure 10A:
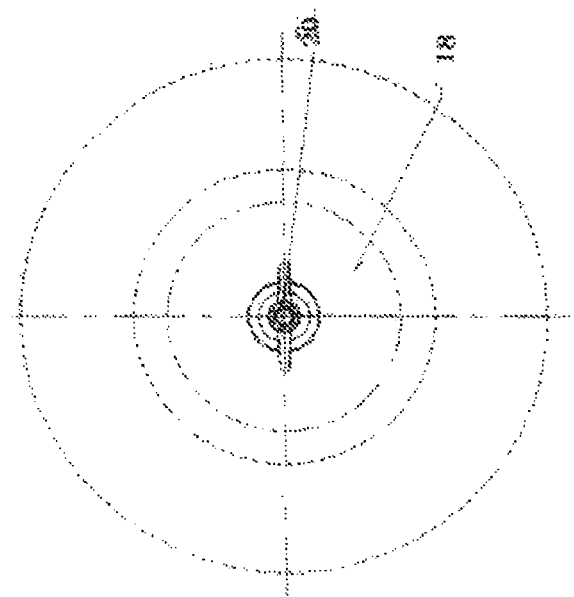
FIG. 10a is a top view of an alternative closed end plate with a captive fastener.
Figure 10B:
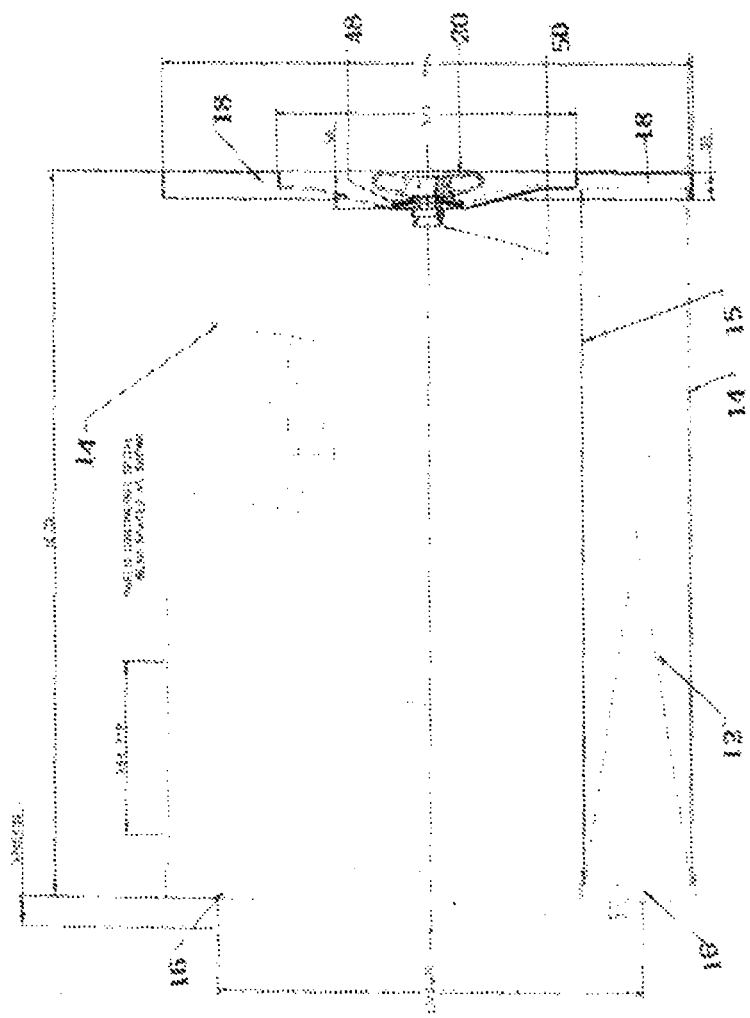
Figure 11A:
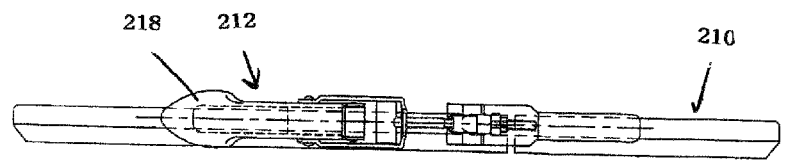
FIG. 11a is a top view of a captured latch clamp assembly for a filter housing in a closed position.
Figure 11B:
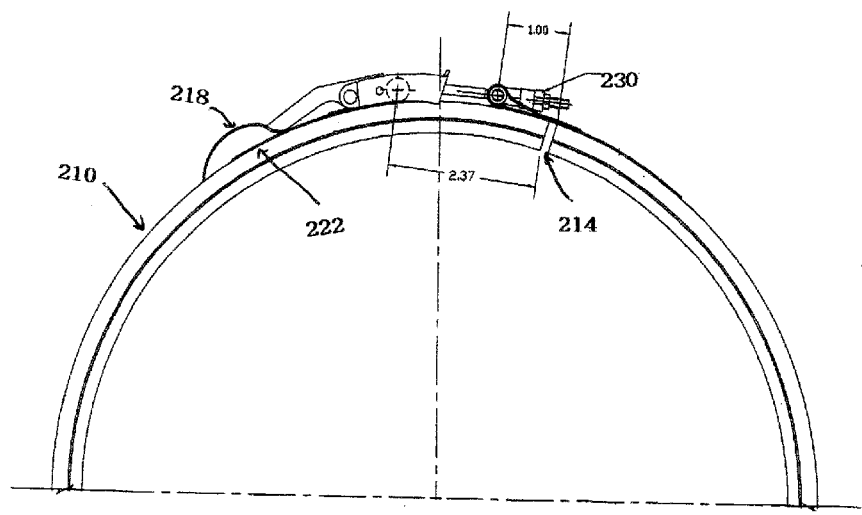
Figure 11C:
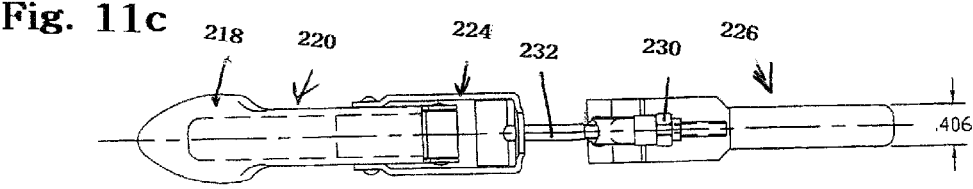
FIG. 11c is a top view of the band of the latch clamp assembly.
Figure 11D:
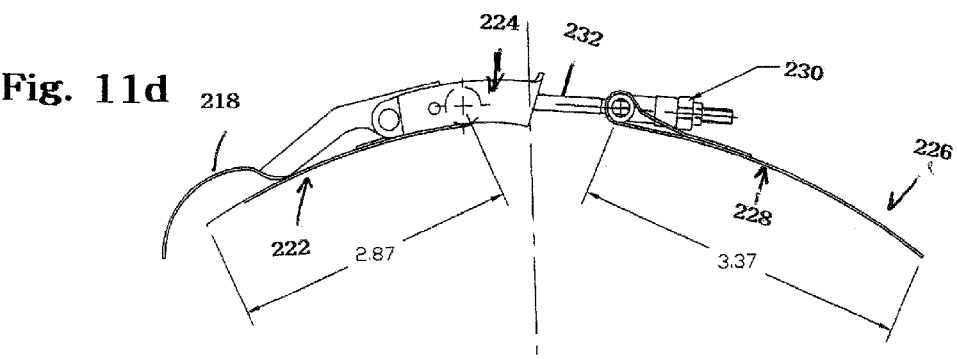
FIG. 11d is a cross section of the band.

An air filter assembly has a cylinder of pleated filter media 12, an exterior wire screen cylinder 14 surrounding the pleated filter media 12 and an interior wire screen cylinder 15 on an interior of the pleaded filter media 12. The wire screen cylinders 14 protect the pleated filter media 12, and provide rigidity and durability to the filter. The filter further comprises a first end with an open end cap 16 and a second end with a closed end cap 18. Open end cap 16 is an annular ring having a lip. The annular ring is sized such that a first end of the pleated filter media 12 and first end of wire screens fit the annular ring. The second end cap has an annular lip 66. Annular lip 66 of closed end cap 18 is sized such that the outer screen and pleated filter media fit in the inner diameter of lip 66. In manufacturing, heat curable adhesive is placed between the end caps and the filter media. One end cap is applied at a time using the heat curable adhesive. After application of the adhesive, the filter standing on an end cap is placed on a heated surface to heat cure the adhesive. The processes is repeated for the other end cap.

The air filter assembly is adapted to be accommodated in an air filter housing 110. A threaded shaft in the housing cavity mates with captive tooless fastener 20 of closed end cap 18 to secure air filter in housing 110. Tooless fastener 20 also acts as a handle for removal of the air filter from housing 110.

Tooless fastener comprises a central shaft 22 extending from a body 24. A cylindrical cavity 26 extends through shaft 22 and body 24. Cylindrical cavity 26 comprises a first portion 26a having a first diameter, a second portion 26b having a second diameter, a third portion 26c have a third diameter and a threaded body portion 26d. Body portion 26d may have a conical shape. Body portion 26d has threads to mate with threads on threaded shaft of the housing 110. An annular rib 28 extends outward at distal end 50 of shaft 22. An inner peripheral edge of annular rib 28 has a bevel 30.

In a second embodiment of the fastener, cylindrical cavity 26 comprises a first portion 26a having a first diameter and a second portion 26b having a second diameter and a threaded body portion 26d.

Length L of central shaft 22 may be adjusted depending on the desired utilization. If the person in the field is likely to be wearing hazmat gloves or other gloves, it is desirable to have a longer shaft 22 such that gloved finger can more easily be inserted under arms 34 when using the fastener as a handle.

Body 24 comprises a central hub 32 with two arms 34 extending from hub 32. Central hub 32 preferably comprises a truncated cone or frustoconical outer surface 36 and substantially planar upper 38 and lower 40 surfaces. Each arm 34 is preferably opposed at a 180° angle to the other. Arms 34 preferably have depressions 42. Depressions 42 make it easier for a user to grip arms 34 when screwing or unscrewing the fastener to central shaft of housing 110. Arms 34 preferably have a contoured lower surface 44. Contoured lower surface 44 makes it easier for a user to pull on the fastener to remove the air filter from housing 110.

Sealing washer 48 is inserted over shaft 22. Shaft 22 of tooless fastener is then inserted through central aperture 52 in closed end cap 18. Distal end 50 of shaft 22 is expanded outward to a diameter greater than the diameter of central aperture 52. Sealing washer 48 may use any know method to seal aperture 52. For example, sealing washer 48 may comprise a metal washer with a layer of neoprene 54. The tooless fastener is oriented such that body 24 and sealing washer 48 are on an upper side of the closed end cap 18 and the expanded distal end 50 is on an under side of closed end cap 18. The fastener is secured to closed end cap 18. Preferably, distal end 50 of center shaft 22 is expanded outward. Optionally, a separate piece can be secured on distal end 50 of shaft 22. For example a nut could be welded to the end of shaft 22, thereby capturing it. However, this method is not preferred as it requires additional parts and there is the risk the separate element such as the nut could become separated from the fastener through rough use or careless assembly.

Closed end cap 18 of the air filter is a plate 60 having a contoured upper 62 and lower 64 surfaces and an annular lip 66. Closed end cap 18 has an annular planar surface 68. Closed end cap 18 is heated at annular planar surface 68 to cure the adhesive used to secure the pleated filter media 12 to closed end cap 18. Closed end cap 18 has an annular depression 70 centered on the plate 60. Central aperture 52 is located at the center of annular depression 70. Annular depression 70 preferably comprises a first flat portion 72, a conical portion 74, and a second flat portion 76.

When the fastening device is secured to the end plate 18, the body 24 must not extend beyond the annular planar upper surface 68 of end cap 18. If it extends beyond the planar surface 68, it becomes difficult to ensure even curing of the adhesive. In addition, if the fastening device extends beyond the planar surface 68 when the air filter is secured in a filter housing 110, the housing cover 112 may not fit properly.

When the air filter is inserted in the housing 110, the central shaft of the housing 110 mates with the cylindrical cavity 26 in the shift of the fastening device. As arms 34 are rotated, the fastening device screws down on the shaft in the housing 110 securing the air filter in the housing 110 and compressing sealing washer 48 around aperture 52. The threads are preferably sized such that an average person can easily hand tighten the fastener to tightness without the danger of overtorquing that is common when using a wrench.

When the air filter is to be removed, arms 34 are used to unscrew the fastener from the central shaft of housing 110. The person in the field can than insert a finger under each arm 34 and use the fastener as a handle to pull the air filter from the housing 110.

Optionally, the air filter is utilized in an air filter housing that is secured using a latch clamp assembly 216. The latch clamp assembly 216 comprises a clamping band 210 and a lever-type band tightening closure mechanism 216. Clamping band 210 is adapted to fit over an open end of the housing chamber and an outer diameter of the housing cover. Band 210 has a divide 214 with a first end on one side of the divide 214 and a second end on the other side of the divide 214.

Lever type band tightening closure mechanism 216 spans the divide 214 and closes the band 210 when the lever 218 is closed. Lever type band closure mechanism comprises a first portion 220 having a first foot 222, a frame 224, and a lever 218, said lever 218 pivotally attached to the frame 224, a second portion 226 comprising a second foot 228, a hex flextop locknut 230 and a pin 232 connecting the first and second portions 220, 228. The first foot 222 is connected to a first end of the band 210 and the second foot 228 is connected to a second end of the band 210. As the lever 218 is pushed down the pin 232 is pulled toward the first side, thus pulling the second end of the band 210 toward the first end of the band 210 and closing divide 214. When the lever 218 is released, the pin 232 is pushed toward the second side and the second end of the band 210 moves away from the first end, thus opening divide 214. Band 210 and lever type band tightening closure mechanism are preferably made of stainless steel.

The invention claimed is:

1. An air filter assembly consisting of;
   a cylindrical filter media;
   a fastening end cap attached to a first end of the filter media;

a longitudinal filter shaft extending along an entire length of the filter media, the fastening end cap having an aperture and being aligned with the longitudinal filter shaft;

a captured wing nut element permanently integrally connected to the fastening end cap and the filter media forming a permanent integral captured wing nut assembly with the fastening end cap and the filter media, the captured wing nut element having a gripping portion and a cylindrical portion with a cylindrical cavity which is slidably disposed within the aperture, the cylindrical portion being extended and being arranged and constructed to allow the gripping portion to be moved away from the end cap, the cylindrical portion having internal female threads;

the gripping portion disposed at a top area and a widened portion of the cylindrical portion disposed at a bottom area distal from the top area;

upon assembly of the cylindrical portion with the end cap, the widened portion being located on an underside of the fastener end cap;

the widened portion being larger in diameter than the fastener end cap aperture and being abutable with the underside of the fastening end cap;

the gripping portion also being larger in diameter than the fastener end cap aperture and being disposed on a top side of the fastener end cap;

the gripping portion having at least one ear extending substantially perpendicular to the cylindrical portion, wherein the captured wing nut assembly is removable as an integral unit from a location in a filtering environment.

\* \* \* \* \*